US009433041B2

(12) United States Patent
Mitterbacher et al.

(10) Patent No.: US 9,433,041 B2
(45) Date of Patent: Aug. 30, 2016

(54) OPERATING CIRCUIT FOR LEDS, HAVING DIMMING SIGNAL COMPRISING HIGH-FREQUENCY MODULATED PULSE PACKET SIGNAL WITH HARMONIZED FREQUENCIES

(71) Applicant: TRIDONIC GMBH & CO KG, Dornbirn (AT)

(72) Inventors: Andre Mitterbacher, Dornbirn (AT); Ueli Keller, Ennenda (CH); Eduardo Pereira, Siebnen (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/386,256

(22) PCT Filed: Mar. 21, 2013

(86) PCT No.: PCT/AT2013/000048
§ 371 (c)(1),
(2) Date: Sep. 18, 2014

(87) PCT Pub. No.: WO2013/138829
PCT Pub. Date: Sep. 26, 2013

(65) Prior Publication Data
US 2015/0084544 A1 Mar. 26, 2015

(30) Foreign Application Priority Data

Mar. 21, 2012 (AT) .............................. GM 108/2012

(51) Int. Cl.
*H05B 33/08* (2006.01)
(52) U.S. Cl.
CPC .......... *H05B 33/08* (2013.01); *H05B 33/0818* (2013.01); *Y02B 20/346* (2013.01)

(58) Field of Classification Search
USPC .................. 315/291, 294, 297, 307
See application file for complete search history.

(56) References Cited

U.S. PATENT DOCUMENTS

| | | | |
|---|---|---|---|
| 6,329,760 B1 * | 12/2001 | Bebenroth | 315/200 A |
| 2003/0085749 A1 * | 5/2003 | Xu et al. | 327/423 |
| 2007/0210725 A1 | 9/2007 | Marosek | |
| 2009/0160360 A1 * | 6/2009 | Lim et al. | 315/294 |
| 2009/0273292 A1 | 11/2009 | Zimmerman | |
| 2010/0156319 A1 | 6/2010 | Melanson | |
| 2010/0277088 A1 | 11/2010 | Bodano | |
| 2012/0104964 A1 * | 5/2012 | Hughes | 315/291 |

FOREIGN PATENT DOCUMENTS

| | | |
|---|---|---|
| DE | 102006034371 A1 | 10/2007 |
| EP | 2012560 A2 | 1/2009 |
| WO | 2004057921 A1 | 7/2004 |

* cited by examiner

*Primary Examiner* — Douglas W Owens
*Assistant Examiner* — Jonathan Cooper
(74) *Attorney, Agent, or Firm* — Volpe and Koenig, P.C.

(57) ABSTRACT

The invention relates to a method for activating at least one LED, which is supplied with a direct current voltage or a rectified alternating current voltage and which by means of a coil (L1) and a first switch (S1) clocked by a control/regulating unit (SR) provides a supply voltage for at least one LED, wherein when the first switch (S1) is switched on the coil (L1) temporarily stores energy that discharges via a diode (D1) and at least one LED when the first switch (S1) is switched off and wherein the control unit (SR) activates the first switch (S1) by means of a dimming signal. Said method is characterized in that the dimming signal is generated by externally combining a low-frequency signal and a high-frequency signal, wherein the pulse width (TON*LF) of the low-frequency signal is selected as an integral multiple of the cycle duration of the high-frequency signal.

10 Claims, 6 Drawing Sheets

Fig. 1a
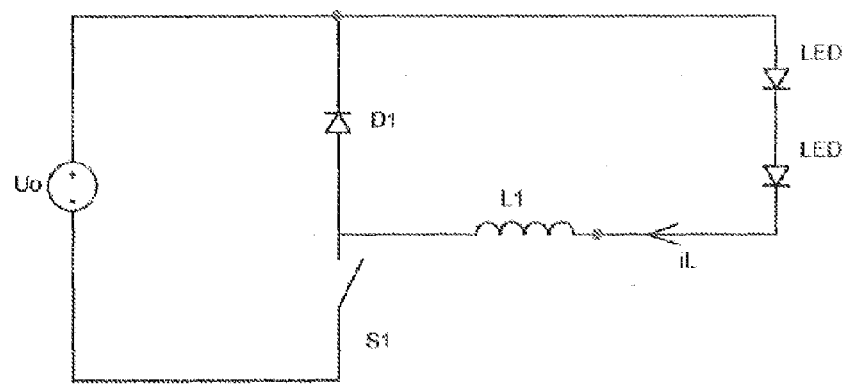
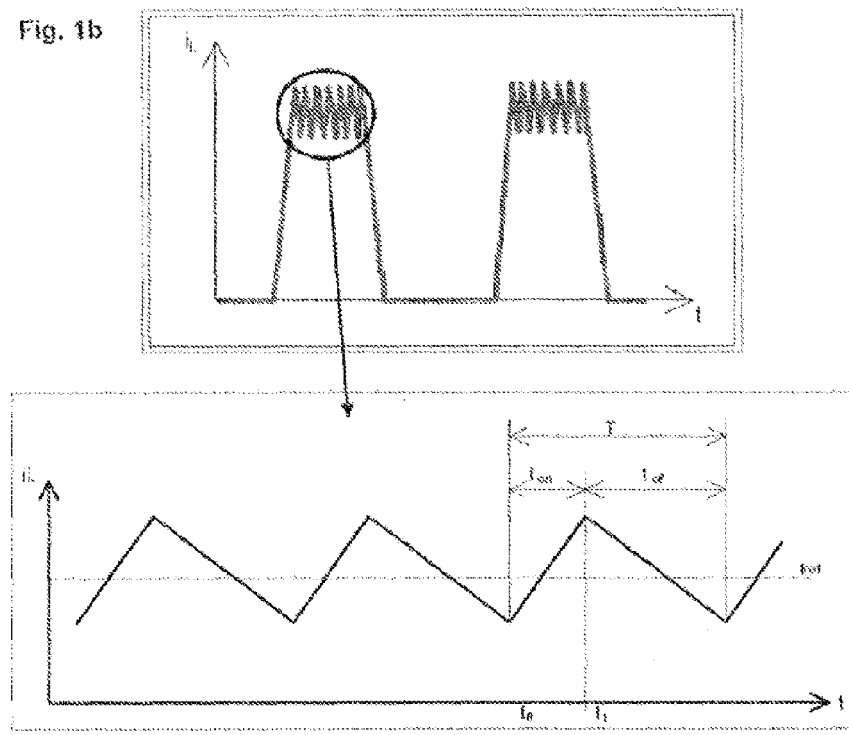
Fig. 1b

OPERATING CIRCUIT FOR LEDS, HAVING DIMMING SIGNAL COMPRISING HIGH-FREQUENCY MODULATED PULSE PACKET SIGNAL WITH HARMONIZED FREQUENCIES

FIELD OF THE INVENTION

The invention relates to an operating circuit comprising light-emitting diodes.

BACKGROUND

Semiconductor light sources such as, for example, light-emitting diodes have increased in interest during recent years for lighting applications. The reason for this consists inter alia in that critical technical innovations and significant advancements both in terms of brightness and in terms of light efficiency (luminous efficacy per watt) of these light sources could be achieved. Not least owing to the comparatively long life, light-emitting diodes could develop as an attractive alternative to conventional light sources such as incandescent lamps or gas discharge lamps.

Semiconductor light sources are sufficiently well known from the prior art and will be abbreviated below as LED (light-emitting diode). This term is intended to include both light-emitting diodes consisting of inorganic materials and light-emitting diodes consisting of organic materials in the text which follows. It is known that the light emission from LEDs correlates with the current flow through the LEDs.

For brightness regulation, LEDs are therefore in principle operated in a mode in which the current flow through the LED is regulated.

In practice, in order to actuate an arrangement of one or more LEDs, preferably switching controllers, for example step-down converters (buck converters) are used. Such a switching controller is known, for example, from DE 10 2006 034 371 A1. In this case, a control unit actuates a high-frequency-clocked switch (for example a power transistor). In the switched-on state of the switch, current flows via the LED arrangement and a coil, which is charged. The buffer-stored energy in the coil discharges in the switched-off state of the switch via the LEDs (freewheeling phase). The current through the LED arrangement demonstrates a zigzag-shaped time profile: when the switch is switched on, the LED current demonstrates a rising edge, and when the switch is switched off, a falling edge results. The mean value of the LED current over time represents the rms current through the LED arrangement and is a measure of the brightness of the LEDs. By corresponding clocking of the power switch, the mean, rms current can be regulated.

The function of the operating device now consists in setting a desired mean current flow through the LEDs and keeping the fluctuation range of the current over time as low as possible, determined by the high-frequency connection and disconnection of the switch (typically in the region above 10 kHz).

A large fluctuation range of the current (ripple) has a disadvantageous effect particularly in the case of LEDs since, with the change in the current amplitude, the spectrum of the emitted light can change.

In order to keep the emitted light spectrum as constant as possible during operation, it is known not to vary the current amplitude in the case of LEDs for brightness regulations, but to use a so-called PWM (pulse width modulation) method. In this case, low-frequency (typically with a frequency in the range of 100-1000 Hz) pulse packets with a constant (when averaged over time) current amplitude are supplied to the LEDs by the operating device. The abovementioned high-frequency ripple is superimposed on the current within a pulse packet. The brightness of the LEDs can now be controlled by the frequency of the pulse packets; the LEDs can be dimmed, for example, by the time interval between the pulse packets being increased.

A practical demand made of the operating device consists in that it can be used as flexibly and in as versatile a manner as possible, for example irrespective of how many LEDs are actually connected as load and are intended to be operated. The load can also change during operation when, for example, an LED fails. In conventional technologies, the LEDs are operated in a so-called "continuous conduction mode". This method will be explained in more detail with reference to FIG. 1a and FIG. 1b (prior art).

In the example shown in FIG. 1a, a step-down converter (buck converter) is illustrated as basic circuit for the operation of at least one LED (or a plurality of LEDs connected in series), which has a first switch S1. The operating circuit is supplied a DC voltage or a rectified AC voltage U0.

In the switched-on state of the first switch S1 (during the time period t_on), energy is built up in the coil L1 and is discharged in the switched-off state of the first switch S1 (time period t_off) via at least one LED. The resultant current profile over time is depicted in FIG. 1b (prior art). In this case, two pulse packets of the PWM are illustrated. The current profile within a pulse packet is additionally illustrated in enlarged form. For reasons of color constancy, the amplitude of the ripple should be as small as possible within a pulse packet. This can take place by suitable selection of the switch-on time t0 and the switch-off time t1. Thus, these times can be selected, for example, in such a way that the first switch S1 is switched on when the current undershoots a specific minimum reference value, and the switch is switched off when the current exceeds a maximum reference value. This method has several disadvantages, however: firstly, in order to achieve as little ripple as possible, a rapid sequence of switch-on and switch-off operations is required. The gradient (positive or negative edge) of the current is not controllable by the operating device and should be considered as being given since it is determined, inter alia, by the inductance of the coil L1 and by the power consumption of the LEDs.

Owing to tolerances in the components of the operating circuit and also owing to the limited resolution of the clock units, flicker phenomena or other disturbances can arise.

SUMMARY

The object of the present invention consists in providing an operating circuit for at least one LED which is improved in comparison with the prior art and a method for operating at least one LED which makes it possible, in a simple manner, to keep the current and therefore the LED power constant.

This object is achieved according to the invention by the features of the independent claims. The dependent claims develop the central concept of the invention in a particularly advantageous manner.

In accordance with a first aspect of the invention, a DC voltage or rectified AC voltage is supplied to the operating circuit for at least one LED. A supply voltage for at least one LED is provided by means of a coil and a first switch clocked by a control unit, wherein, when the first switch is switched on, energy is buffer-stored in the coil, which is discharged via a diode and via the at least one LED when the first switch is switched off.

The control unit actuates the first switch with a dimming signal, wherein the dimming signal is generated by linking a low-frequency signal and a high-frequency signal, and this linking is preferably arranged within the control unit. The pulse width (TON*LF) and/or the period of the low-frequency signal are selected or fixed as an integral multiple of the period of the high-frequency signal.

A change in the brightness of the LED can take place by means of a change in the frequency of the low-frequency signal. The change in the frequency takes place by virtue of a change in the switch-off time period of the low-frequency signal. Preferably, in this case the switch-off time period of the low-frequency signal increases when the brightness is intended to be reduced, and the switch-off time period of the low-frequency signal is reduced when the brightness is intended to be increased.

The control unit can select the switch-off time of the first switch such that as few switching losses as possible occur and nevertheless the current flow through the at least one LED has as little ripple as possible.

For example, the operating circuit has a first sensor unit, which generates a first sensor signal which is dependent on the current flow through the first switch, and/or a second sensor unit, which detects the achievement of demagnetization of the coil and generates a second sensor signal. The second sensor unit can, for example, also detect the voltage or the current through the LED and generate a second sensor signal in dependence thereon. The sensor signals are supplied to the control unit and processed.

For example, the control unit uses a signal from the first sensor unit or a signal from the second sensor unit or a combination of the two signals to fix the switch-on and/or switch-off time and/or the duty factor of the first switch.

For example, the control unit switches off the first switch when the current through the first switch exceeds a maximum reference value and switches it on again optionally at the time when the current through the LED undershoots a minimum reference value, for example when the coil is demagnetized and/or the diode turns off. The time of renewed switch-on can also be fixed by a preset frequency.

In a preferred embodiment of the invention, the first sensor unit is a shunt. In a further embodiment of the invention, the second sensor unit is a secondary winding coupled inductively to the coil or a Hall sensor or the second sensor unit identifies the achievement of demagnetization of the coil by virtue of it monitoring the voltage above the first switch by means of a (resistive) voltage divider.

In a further embodiment of the invention, the operating circuit for at least one LED is formed by a resonant or quasi-resonant circuit. A supply voltage for at least one LED is provided by means of at least one first switch clocked by a control unit, wherein the first switch, in the switched-on state, feeds a resonant circuit, which preferably has at least one coil as inductance. Energy is buffer-stored in the resonant circuit, preferably in the coil, and this energy is discharged via a diode and via the at least one LED when the first switch is switched off. A capacitor can also be connected between the diode and the LED as smoothing capacitor, which is arranged directly or indirectly in parallel with the LED. The resonant circuit can also have a resonant capacitor. The coil can also be part of a transformer or it is also possible for a transformer to be arranged in the resonant circuit in addition to the coil. The first switch can also be part of an inverter, for example an alternately clocked half-bridge.

The invention also relates to a method for actuating at least one LED.

Further preferred embodiments and developments of the invention are the subject matter of further independent claims.

BRIEF DESCRIPTION OF THE DRAWINGS

The present invention will be described in more detail below on the basis of preferred exemplary embodiments with reference to the attached drawings.

FIG. 1a shows a circuit arrangement in accordance with the known prior art;

FIG. 1b shows a graph illustrating the time profile of the LED current in the circuit arrangement shown in FIG. 1a (prior art);

FIG. 2b shows a graph illustrating the time-dependent current profiles and control signals in the circuit arrangement illustrated in FIG. 2a;

DETAILED DESCRIPTION OF THE PREFERRED EMBODIMENTS

FIG. 1a and FIG. 1b show the prior art.

Figure 2A:
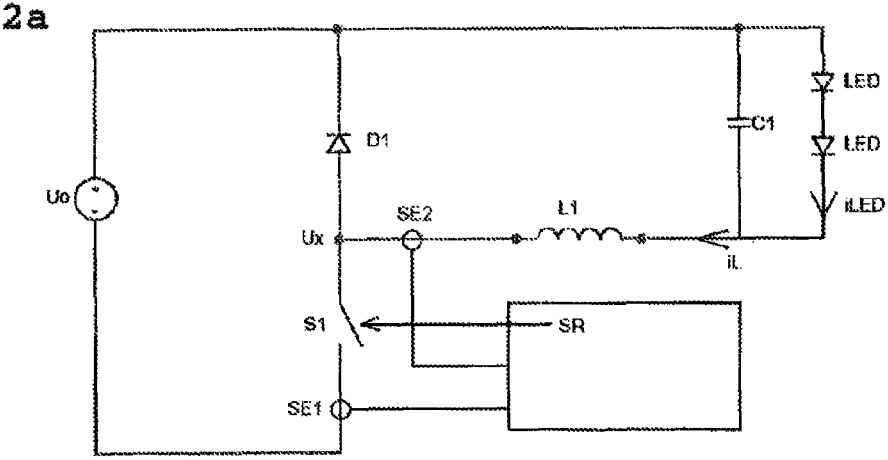
FIG. 2a shows a first example of an operating circuit (buck) for LEDs.

The circuit arrangement illustrated in FIG. 2a is used for operating at least one (or a plurality of series-connected and/or parallel-connected) LED(s). In the example illustrated, two LEDs are connected in series, for example; it is naturally also possible for only one or a plurality of LEDs to be provided.

The LED or the series-connected and/or parallel-connected LEDs will also be referred to below as LED string. One advantage of the present invention consists in that the operating circuit adapts very flexibly to the type and number of LEDs connected in series. A DC voltage U0, which can naturally also be a rectified AC voltage, is supplied to the circuit. Preferably, the DC voltage U0 is a DC voltage which is as constant as possible, however, but it may have a small AC component as ripple. The LEDs are connected in series with a coil L1 and a first switch S1.

In addition, the circuit arrangement has a diode D1 (the diode D1 is connected in parallel with the LEDs and the coil L1) and optionally a capacitor C1, which is connected in parallel with the LEDs. In the switched-on state of the first switch S1, current flows through the LEDs and through the coil L1, which is thus magnetized. In the switched-off state of the first switch S1, the energy stored in the magnetic field of the coil discharges in the form of a current via the diode D1 and the LEDs. At the same time as this, at the beginning of the switchon of the first switch S1, the capacitor C1 is charged. During the switch-off phase of the first switch S1 (freewheeling phase), the capacitor C1 is discharged and contributes to the current flow through the LED string. Given suitable dimensioning of the capacitor C1, this results in smoothing of the current through the LEDs.

A field-effect transistor or else bipolar transistor is preferably used as the first switch S1. The first switch S1 is switched at a high frequency, typically in a frequency range of above 10 kHz, preferably above 50 kHz.

One advantage of this mode of operation consists in that the first switch S1 is protected during operation when, as mentioned later, it is preferably switched on when the power present at said switch is virtually zero. In the prior art, however, where the switching operations take place at high power, a high-value component with a very short switching duration needs to be used for the first switch S1 in order to keep the switching losses within a tolerable range.

One advantage of this mode of operation consists in that a comparatively less expensive component with a comparatively slightly longer switching duration or longer clearance time can indeed also be used for the first switch S1 and the diode D1.

In the circuit in FIG. 2a, furthermore a control unit SR is provided which presets the clocking of the first switch S1 for the regulation of the LED power.

The control unit SR uses signals from a first sensor unit SE1 and/or signals from a second sensor unit SE2 as input variables for fixing the precise switch-on and output time of the first switch S1.

The first sensor unit SE1 is arranged in series with the first switch S1 and detects the current flow through the first switch S1. It is used for monitoring the current flow through the first switch S1. If the current flow through the first switch S1 exceeds a specific maximum reference value, the first switch S1 is switched off.

In an advantageous embodiment, the first sensor unit SE1 may be, for example, a shunt (current measuring resistor).

In order to monitor the current flow, the voltage drop across the shunt can now be tapped off and compared with a reference value, for example by means of a comparator.

If the voltage drop across the shunt exceeds a specific value, the first switch S1 is switched off.

The second sensor unit SE2 is arranged within the current branch through which current flows during the freewheeling phase, preferably in the vicinity of or at the coil L1 or else in series or in parallel with the LED (for example as current mirror). With the aid of the second sensor unit SE2, the control unit unit SR can fix a suitable time for the switch-on time of the first switch S1.

In a possible operating mode, the first switch S1 is preferably switched on when the current through the coil L1 is zero for the first time or is at least very low, i.e. preferably in the time range when the diode D1 turns off at the end of the freewheeling phase. In this case, a current which is as low as possible is present at the switch S1 at the switch-on time of the first switch S1.

Identification of the current zero crossing of the current through the coil L1 enables virtually loss-free switching. Preferably, the current through the LEDs only demonstrates a low amount of ripple and does not fluctuate significantly. This can be attributed to the smoothing effect of the capacitor C1 connected in parallel with the LEDs. During the phase of a low coil current, the capacitor C1 performs the task of feeding the LED.

The switch-off duration of the switch S1 can also be preset by a fixedly preset frequency, however. In this case, the switch-off duration of the switch S1 results from the remaining residual time of the period of the clock frequency of the switch S1 (also referred to below as high-frequency signal), i.e. the difference between the period and the switch-on duration of the switch S1.

Figure 2B:
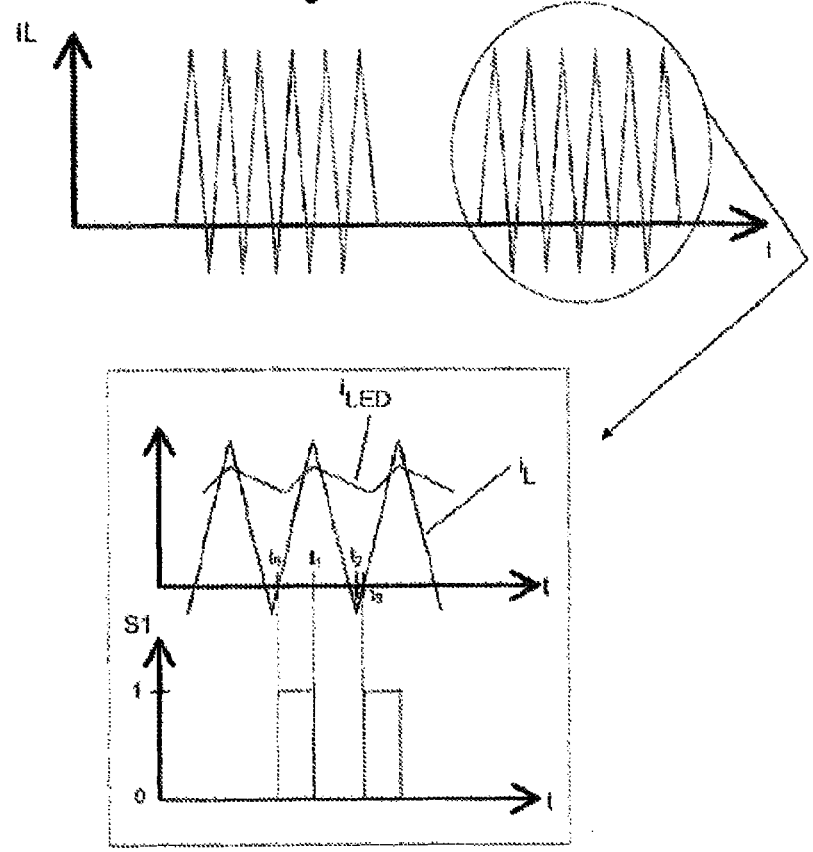

The individual current profiles and the optimum switch-on time of the first switch S1 will be explained in more detail with reference to the graph shown in FIG. 2b.

Similarly to the graph shown in FIG. 1b, the time profile of the current i_L over two pulse packets is illustrated.

The enlarged illustration shows the current profile within a PWM pulse packet: the time profile of the current i_L through the coil L1, the time profile of the current i_LED through the LEDs and the time profile of the state of the first switch S1 are plotted (in state 0, the first switch S1 is in the switched-off state, in state 1, the switch is closed; the signals for the state of the switch S1 correspond to the actuation signal (i.e. at the gate) of the switch S1). At time t_0, the first switch S1 is closed and a current begins to flow through the LED and the coil L1. The current i_L demonstrates a rise in accordance with an exponential function, wherein, in the region of interest here, a quasi-linear rise in the current i_L can be identified.

i_LED differs from i_L in that some of the current i_L contributes to charging of the capacitor C1. The opening of the first switch S1 at time t_1 (for example when a desired maximum reference value is reached) results in the energy stored in the magnetic field of the coil being discharged via the diode D1 and the LEDs or the capacitor C1. The current i_L continues to flow in the same direction, but decreases continuously and can even reach a negative value. A negative current (i.e. a current flow with a reversed direction) is present as long as the charge carriers, which were previously charged in the conductively polarized diode D1, are cleared from the barrier of the diode D1.

The current i_LED, on the other hand, decreases only weakly and is maintained since the capacitor C1 has a smoothing effect. At time t_2, the diode turns off. The current i_L decreases (but continues to be negative) and moves toward zero. In this phase, parasitic capacitances at the diode D1 and further parasitic capacitances in the rest of the circuit undergo charge reversal.

The voltages at the node Ux above the first switch S1 and at the coil L1 change very quickly in this time period. The voltage at the node Ux drops to a low value (owing to the diode D1 turning off). An advantageous renewed switch-on time t_3 for the first switch S1 is now provided when the current i_L reaches the zero crossing, or at least the vicinity of the zero crossing. At this time, the coil L1 is not or is barely magnetized.

The first switch S1 can be switched on at this time with very low losses since hardly any current is flowing through the coil L1. Renewed switch-on is also possible even at time t_2 or shortly prior to this, however, since the current through the coil L1 is very low in this time range.

A second sensor unit SE2 is now used for detecting the advantageous switch-on time for the first switch S1. In a first embodiment, for example, the current i_L through the coil L1 can be detected. However, this requires relatively complex circuits. The current i_L through the coil L1 can be detected, for example, by means of a Hall sensor. In addition or as an alternative, therefore, further/other variables can be used which are suitable for detecting an advantageous switch-on time.

In a further embodiment, for example, the magnetization state of the coil L1 can be detected. The second sensor unit SE2 may be, for example, a secondary winding L2 at the coil L1, which taps off the voltage at the coil L1. The monitoring of the voltage profile of the voltage at the coil L1 over time (in particular the "dip" shortly after the diode D1 turning off after the time t_2) gives an indication of the advantageous renewed switch-on time of the first switch S1. In a simple variant embodiment, a comparator which can identify the achievement of demagnetization (and therefore the zero crossing) on the basis of a threshold value being exceeded or undershot would be sufficient.

Instead of or in addition to the voltage monitoring at the coil L1, for example, the voltage at the node Ux above the first switch S1 can be monitored. The voltage at the node Ux drops significantly from a high value to a low value when the diode turns off. The signal for renewed switch-on of the first switch S1 can therefore be triggered when the voltage Ux undershoots a certain threshold value. The control unit SR switches on the first switch S1 again at the time when the coil L1 is demagnetized and/or the diode D1 turns off. The second sensor unit SE2 can in this case comprise a secondary winding L2, which is coupled inductively to the coil L1, or a voltage divider (R1, R2) at the node Ux.

For operation of the operating circuit and setting of the current through the LED, however, other regulation mechanisms are also conceivable; for example a preset threshold value for the LED current being undershot can be a condition for renewed switch-on. Regulation merely on the basis of the current through the shunt RS detected during the switch-on phase of the switch S1 would also be possible, wherein, in this case, for example, the switch-on time of the switch S1 can be varied given a fixed clock frequency or the LED current can be regulated on the basis of the current averaged over time.

The control unit SR uses the information from the first sensor unit SE1 and/or the second sensor unit SE2 for fixing the switch-off and switch-on time of the first switch S1 and therefore generates a high-frequency signal for direct or indirect regulation of the LED current. Power regulation by means of the evaluation of the power supplied to the operating circuit is also conceivable.

Setting of the brightness can be performed by setting the LED power, averaged over time, by the control unit SR, preferably in the form of low-frequency PWM signals. The frequency of the low-frequency PWM signal for setting the brightness is typically of the order of magnitude of 100-1000 Hz.

FIG. 8b shows an example in accordance with the prior art, in which a pulse packet (as explained already in FIG. 1b) of high-frequency pulses is chopped by the end of the pulse width of the low-frequency pulse, to be precise at a time at which a period of a high-frequency pulse is not completed. The pulse width of the low-frequency pulse in this case determines the width of the pulse packet. Such chopping can occur both during a falling and a rising edge of a high-frequency pulse.

Figure 7:
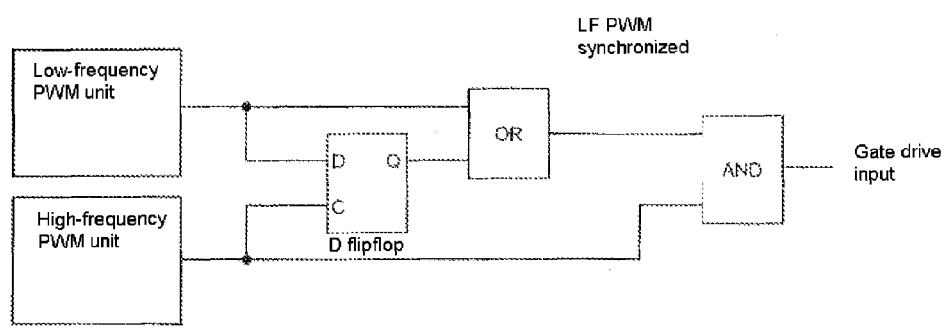
FIG. 7 shows a first example of an embodiment according to the invention of a control unit SR.

The example shown in FIG. 7 shows the actuation of the switch S1 in accordance with the invention by the control unit SR, as is applicable, for example, to the circuit in accordance with the example shown in FIG. 2. In FIG. 8a, the low-frequency signal (LF) and the high-frequency signal (HF) and the resultant dimming signal (FET) are represented in terms of their exemplary time profiles, and the precise mode of operation is explained below with reference to the example in FIG. 7.

A possible implementation of the invention within a control unit SR is illustrated in FIG. 7. The control unit SR actuates the first switch S1 with a dimming signal, wherein the dimming signal is generated by linking a low-frequency signal and a high-frequency signal.

The low-frequency signal and the high-frequency signal can be linked internally in the control unit SR and are output at an output of the control unit SR.

The low-frequency signal, which can be generated by a low-frequency PWM unit, and the high-frequency signal, which can be generated by a high-frequency PWM unit, can be linked via a coupling element. The coupling element can be formed by a logic operator. In the example in FIG. 7, the low-frequency signal, which is generated by a low-frequency PWM unit, is supplied to the D input of a D flipflop. The high-frequency signal, which is generated by a high-frequency PWM unit, is supplied to a C input of the D flipflop. The resultant signal present at the output Q of the D flipflop is supplied to an OR operator. The OR operator is also supplied the low-frequency signal which is generated by a low-frequency PWM unit. The output signal of the OR operator is supplied to an AND operator. The AND operator is also supplied a high-frequency signal, which is generated by a high-frequency PWM unit. The signal produced at the output of the AND operator forms the dimming signal, which is supplied to the gate driver input of the control unit SR and therefore to the gate of the switch S1.

The linking of the low-frequency signal and the high-frequency signal can also be performed via a computation of the parameters for the low-frequency signal on the basis of the parameters such as the period (T_HF) of the high-frequency signal, for example in the case of a digital system, however.

The low-frequency signal and the high-frequency signal are preferably linked internally to give the dimming signal, and the dimming signal is output at an output of the control unit (SR). The control unit (SR) preferably has means for linking the low-frequency signal and the high-frequency signal in order to select or fix the pulse width (TON*LF) of the low-frequency signal as an integral multiple of the period (T_HF) of the high-frequency signal.

It would also be possible for a microcontroller which is external to the control unit (SR) to generate the low-frequency signal by virtue of the microcontroller having a low-frequency PWM unit. This low-frequency signal can be supplied to the control unit SR, wherein the control unit SR can have only the high-frequency PWM unit for generating the high-frequency signal and the coupling element for linking the low-frequency signal and the high-frequency signal. Such a system is explained as an example in FIG. 6.

During dimming of the LED, the frequency of the low-frequency signal can be changed. The change in the frequency of the low-frequency signal can be selected depending on the change in the pulse width (TON*LF) of the low-frequency signal. The change in the frequency in this case results from matching of the switch-off duration of the low-frequency signal. Preferably, the length of the switch-off duration of the low-frequency signal is increased in order to reduce the brightness or the dimming level.

The change in the frequency and the pulse width (TON*LF) of the low-frequency signal can be performed such that the pulse control factor of the low-frequency signal remains constant at a constant dimming level or brightness level.

Preferably, the low-frequency signal is a low-frequency-pulsed, in particular PWM signal, in particular in the range of approximately 100 Hz to 1000 Hz, preferably in the range of from 500 Hz to 1000 Hz. A change in the frequency of the low-frequency signal required for dimming or changing the brightness can in this case be in the range of, for example, 100 Hz to 200 Hz. Preferably, the high-frequency signal is a high-frequency-pulsed, in particular PWM signal, for example in the region of approximately 50 kHz or above.

Owing to the linking of the low-frequency signal with the high-frequency signal, it may be necessary for permanent detection and matching of the low-frequency signal in respect of its pulse width to be performed in the case of a permanent change in the frequency of the high-frequency signal.

Owing to the linking of the low-frequency signal with the high-frequency signal, it may be necessary for the pulse width of the low-frequency signal to be changed only incrementally during dimming or changing of the brightness, wherein the increment length is a complete period or a multiple of the complete period of the high-frequency signal. Precise graduation of the matching of the brightness or the dimming level can then be performed over the length of the switch-off duration of the low-frequency signal.

The dimming signal via which the brightness of the LED is set is therefore formed from pulse packets, preferably as a resultant pulsed, in particular PWM signal, wherein the pulse packets are interrupted by relatively long interpulse periods.

The dimming signal can be dependent on a brightness preset which is preset externally, for example by a user. This brightness preset can be controlled by the supplied low-frequency signal.

The low-frequency signal can be dependent on the desired dimming level of the LED. The low-frequency signal can also be preset by a further integrated control circuit, such as, for example, a microcontroller, which is arranged as central controller, and only looped through by the control unit SR. The low-frequency signal can also be preset by a further microcontroller, which is arranged as central controller, and does not necessarily need to be output or looped through by the control unit SR.

The high-frequency signal can be dependent on the current and/or the voltage through the LED. The high-frequency signal is dependent on a control loop, wherein, depending on at least one preset setpoint value for a current and/or a voltage within the operating circuit and the comparison with an actual value, at least the first switch S1 is clocked by a high-frequency actuation. For example, the operating circuit can be operated in the hysteresis mode, wherein the switch S1 is switched on and off depending on threshold values being reached (for example in the case of switch-on of the switch S1 when the zero crossing of the current through the coil L1 is reached or when a lower limit value for the LED current is undershot and switch-off of the switch S1 when a current through the switch S1 is exceeded). In accordance with the invention, no consideration needs to be given to the present brightness of the LED with this control loop.

Therefore, the invention results in the advantage that the control loop for the regulation of the current through the LED can be decoupled from the presetting of the brightness and nevertheless actuation of the switch via a single actuation signal is possible (wherein the linking of the high-frequency signal of the control loop with the low-frequency signal for the brightness is linked preferably internally in the control unit SR.

The control loop for the regulation of the current through the LED and therefore the high-frequency signal can also be used for compensating for fluctuations occurring in the DC voltage U0. For example, the DC voltage U0 can have a ripple with twice the line voltage when the DC voltage U0 is fed, for example, from a 230 V grid with a line frequency of 50 Hz via a rectifier and an optionally interposed power factor correction circuit. The DC voltage U0 can in this case have, for example, a ripple of 100 Hz with approximately 10% amplitude in comparison with the amplitude of the DC voltage component. The operating circuit with its control loop can now be designed to match the high-frequency signal such that this 100 Hz ripple is not passed onto the LED but is reduced. This can be performed, for example, directly by means of a quick-response control loop or else by the information on the present amplitude of the DC voltage U0 being passed on, wherein, depending on the present amplitude of the DC voltage U0, the frequency of the high-frequency signal can be matched. Such control is also referred to as feedforward control.

Since the period of the high-frequency signal therefore changes in synchronism with the amplitude of the ripple of the DC voltage U0 (i.e. the fluctuation in the DC voltage U0) and this takes place continuously, the present amplitude of the DC voltage U0 can also be taken into consideration when the pulse width (TON*LF) of the low-frequency signal is fixed. With knowledge of the profile of the fluctuation of the DC voltage U0, it is also possible for matching of the pulse width (TON*LF) of the low-frequency signal to take place depending on the present profile of the DC voltage U0. Therefore, when fixing the pulse width (TON*LF) of the low-frequency signal, the present amplitude of the DC voltage U0 and/or the present profile of the DC voltage U0 can also be taken into consideration.

The invention therefore ensures that a pulse packet of high-frequency pulses is not chopped by the end of the pulse width of the low-frequency pulse, but the pulse width of the low-frequency pulse is matched to the duration of the pulse packet comprising high-frequency pulses.

The control unit SR can be formed by a microcontroller, FPGA, PAL or else an application-specific integrated circuit (ASIC).

Figure 3:
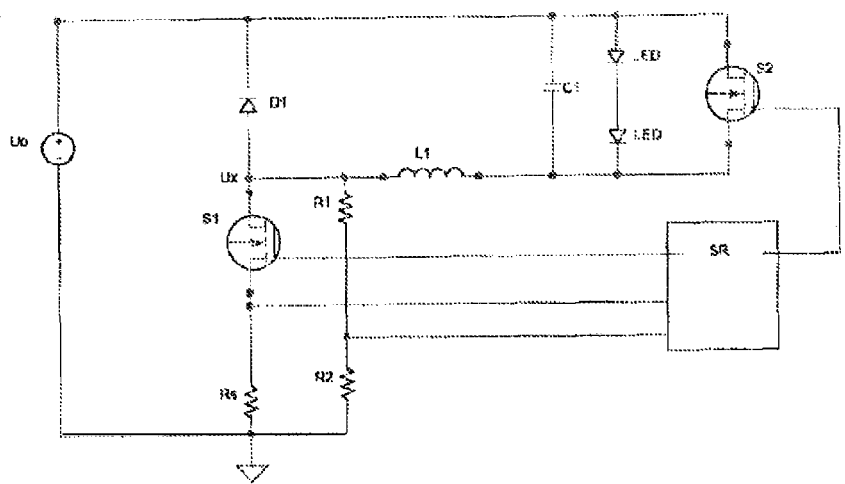
FIG. 3 and FIG. 4 show specific embodiments of an operating circuit.

The actuation according to the invention is not limited to the topology or circuit arrangement shown in FIG. 3; implementations in accordance with the circuits shown in FIGS. 1 to 6 are likewise possible. For example, this invention can be used in the case of a step-down converter, step-up converter, inverter (buck-boost converter), isolated flyback converter, Sepic converter, half-bridge converter or else other topologies and circuit arrangements.

The invention in principle relates to operating circuits for at least one LED which are supplied by means of a switching controller via at least one clocked first switch S1, wherein the current through the LED is influenced via the frequency and/or the pulse control factor of the clocked switch S1, and the frequency and/or the pulse control factor of the clocked switch S1 is preset by a control unit SR by means of a dimming signal as actuation signal, wherein the dimming signal is generated by linking a low-frequency signal and a high-frequency signal. The low-frequency signal (LF) and the high-frequency signal (HF) are preferably linked via a coupling element. The control unit SR can select the pulse width (TON*LF) and/or the period of the low-frequency signal as an integral multiple of the period of the high-frequency signal. The coupling element therefore represents an example of means for linking the low-frequency signal (LF) and the high-frequency signal (HF).

Figure 8:
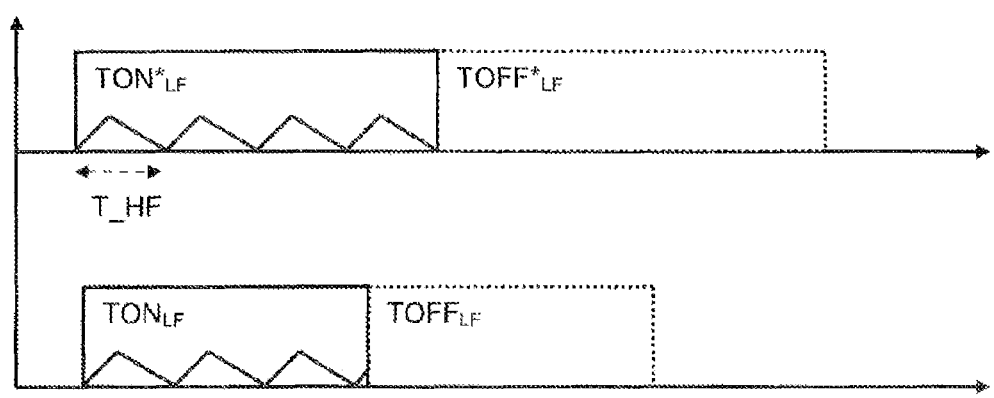
FIG. 8a shows an example of an actuation in accordance with the invention of an operating circuit for LEDs.
FIG. 8b shows an example of an actuation of an operating circuit for LEDs in accordance with the prior art.

The examples in FIG. 7 or FIG. 8 (and naturally also the other figures) can be extended to the extent that a plurality of operating circuits as shown in FIG. 7 or 8 or provided.

The control units SR of the individual operating circuits can be actuated by a common microcontroller. However, it would also be possible to arrange the function of the central actuation of the individual operating circuits by a central controller and the regulation of the operation of the operating circuits by the control units SR in a common microcontroller. The individual operating circuits can, for example, actuate LED strings of different wavelength or color. The actuation by the microcontroller can take place via an interface (wirelessly or in wired fashion). In this case, control signals for setting the brightness or color or status information can be transmitted via the interface.

The invention therefore also makes possible a method for actuation of at least one LED, wherein the control unit SR actuates the switch S1 with a dimming signal, and wherein the dimming signal is generated by linking a low-frequency signal and a high-frequency signal. The pulse width (TON*LF) and/or the period of the low-frequency signal is in this case selected as an integral multiple of the period of the high-frequency signal.

Figure 9:
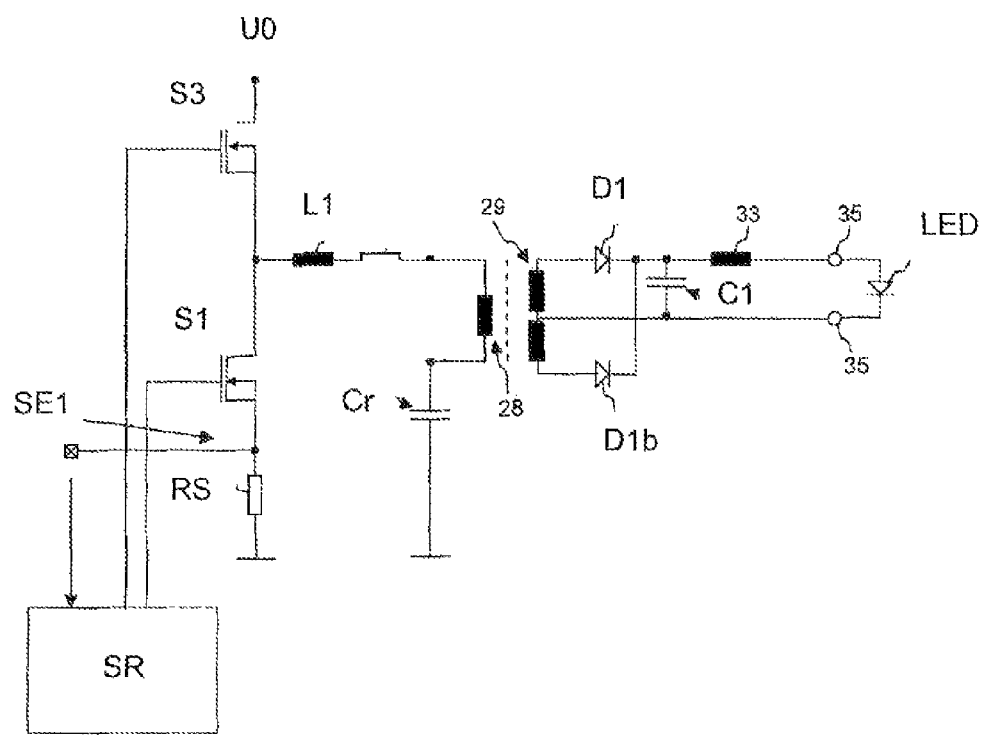
FIG. 9 shows a further embodiment of an operating circuit.

In a further exemplary embodiment, the operating circuit for at least one LED is formed by a resonant or quasi-resonant circuit (FIG. 9). A supply voltage for at least one LED is provided by means of at least one first switch S1, which is clocked by a control unit, wherein the first switch S1, in the switched-on state, feeds a resonant circuit, which preferably has at least one coil L1 as inductance. Energy is buffer-stored in the resonant circuit, preferably in the coil L1, and is discharged via a diode D1 and via the at least one LED when the first switch S1 is switched off. A capacitor C1 can also be connected between the diode D1 and the LED as smoothing capacitor, which capacitor is arranged directly or indirectly in parallel with the LED. The resonant circuit can also have a resonant capacitor Cr. The coil L1 can also be part of a transformer or it is also possible for a transformer (28, 29) to be arranged in the resonant circuit in addition to the coil. The first switch S1 can also be part of an inverter, for example an alternately clocked half-bridge with the two switches S1 and S3. A so-called LLC converter (series-resonant isolated LLC half-bridge converter) is illustrated by way of example in the example shown in FIG. 9. The half-bridge with the alternately clocked switches S1 and S3 can be actuated, in accordance with the invention, by the dimming signal, wherein the two switches S1 and S3 are each activated with 50% duty factor at high frequency during the pulse width (TON*LF) of the low-frequency signal. The frequency of the high-frequency signal can result from the control loop or the manipulated variable for the operating circuit, for example depending on the current through the first sensor unit, which preferably detects the current through the LED, through one of the two switches S1 or S3 or in the resonant circuit, preferably through the coil L1. The pulse width (TON*LF) and/or the period of the low-frequency signal is selected as an integral multiple of the period (T_HF) of the high-frequency signal. The operating circuit can also have further filter or smoothing elements at the output, for example an inductance 33. The transformer can also have a plurality of taps on the secondary side on its secondary winding 29, and it is thus also possible for further diodes such as the diode D1b to be arranged in order to enable increased utilization of the transmitted energy.

Figure 4:
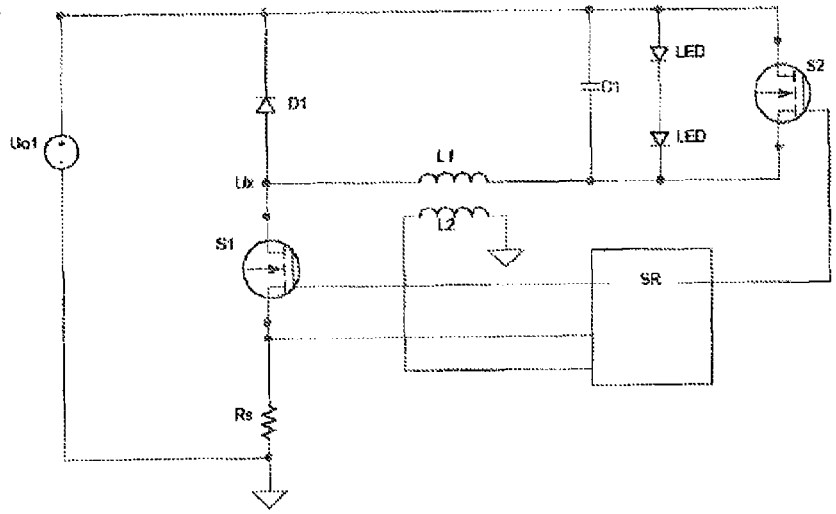

FIG. 3 and FIG. 4 show specific further embodiments of the invention.

FIG. 3 illustrates a specific embodiment of the above-described circuit arrangement (a step-down converter or buck converter).

The advantageous switch-off time is in this case detected by means of detection of the voltage at the node Ux above the first switch S1. This takes place by means of the resistive voltage divider R1 and R2. The node Ux is between the coil L1, the diode D1 and the switch S1.

A capacitive voltage divider or combined voltage divider which comprises resistance and capacitance is also possible as voltage divider, for example. The shunt RS is used for current detection of the current through the first switch S1. The monitoring of the voltage profile over time at the node Ux (in particular the "dip" shortly after the diode D1 turning off in the vicinity of the time t_2) gives an indication of the advantageous renewed switch-on time of the first switch S1. Instead of or in addition to voltage monitoring at the coil L1, the voltage at the node Ux above the first switch S1 can be monitored, for example. The voltage at the node Ux drops significantly from a high value to a low value when the diode turns off. The signal for renewed switch-on of the first switch S1 can therefore be initiated when the voltage Ux undershoots a certain threshold value.

In addition, a second switch S2 is arranged in parallel with the LEDs and the capacitor C1 in the circuit arrangement shown in FIG. 3. The second switch S2 is selectively/independently actuable and can be a transistor (MOSFET or bipolar transistor), for example. If the second switch S2 is closed, the discharge operation of the capacitor C1 is accelerated. By virtue of the accelerated discharge of the capacitor C1, the current flow through the LED becomes zero as quickly as possible. This is desirable, for example, at the end of a PWM packet, where the current flow through the LED is intended to drop as quickly as possible, i.e. the falling edge of the current profile should be as steep as possible (for reasons of color constancy). Preferably, the second switch S2 can be activated and actuated at a low dimming level, at which the PWM packets are very short and it is important for the current through the LED to get to zero quickly at the end of a pulse packet. For example, by suitable actuation of the second switch S2, an even lower dimming level can be achieved. A further function of this second switch S2 consists in that it bypasses the LEDs in the switched-on state. This is necessary, for example, when the LEDs are intended to be switched off, i.e. are intended not to emit any light, but the supply voltage U0 is still present. Without the bypassing by the second switch S2, a current (even though this is a small current) would flow via the LEDs and the resistors R1 and R2 and illuminate the LEDs (slightly).

It is noted that the arrangement of a second switch S2 in parallel with the LEDs and the capacitor C1 for accelerated discharge of the capacitor C1 or for bypassing the LED is not only restricted to the specific embodiment of the circuit arrangement shown in FIG. 3, but can be applied as an additional improvement in various embodiments of the invention.

FIG. 4 shows a modification of the circuit in FIG. 3 to the extent that the voltage monitoring takes place at the coil L1. The voltage at the coil S1 can be detected, for example, by means of a secondary winding L2, which is coupled to the coil S1 (or an additional coil L2, which is coupled inductively to the coil L1). In order to detect the advantageous switch-on time for the first switch S1, a secondary winding L2 is now used. The monitoring of the voltage profile of the voltage at the coil L1 over time (in particular the "dip" in the vicinity of the time at which the diode D1 turns off at time t_2) gives an indication of the advantageous renewed switch-on time of the first switch S1. This monitoring can take place, as already mentioned, on the basis of a secondary winding L2 as well.

The determination of the time of the zero crossing or the demagnetization can also take place, as already mentioned, by means of threshold value monitoring (monitoring whether a threshold value is undershot or exceeded; during monitoring by means of a secondary winding L2, the polarity of the voltage is dependent on the winding sense of the secondary winding L2 with respect to the coil L1).

It is noted that the method for detecting an advantageous switch-on time for the first switch S1 can naturally be applied to other circuit topologies, for example for a so-called flyback converter or buck-boost converter or a so-called forward converter.

Figure 5:
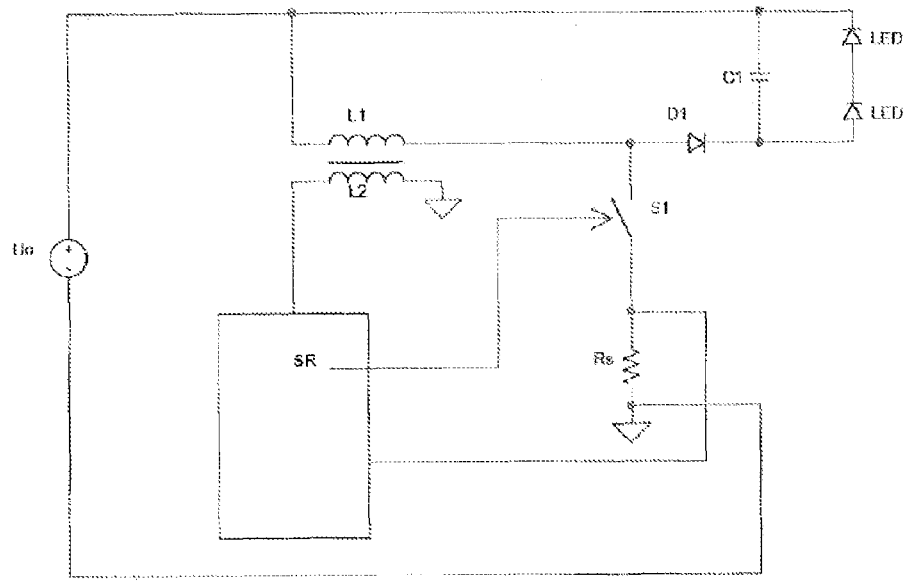
FIG. 5 shows a modification of the circuit shown in FIG. 2a (buck-boost)

FIG. 5 shows a modification of the circuit shown in FIG. 2a to the extent that the arrangement of the inductor L1, the diode D1 and the orientation of the LED string is modified (flyback converter or buck-boost converter).

Figure 6:
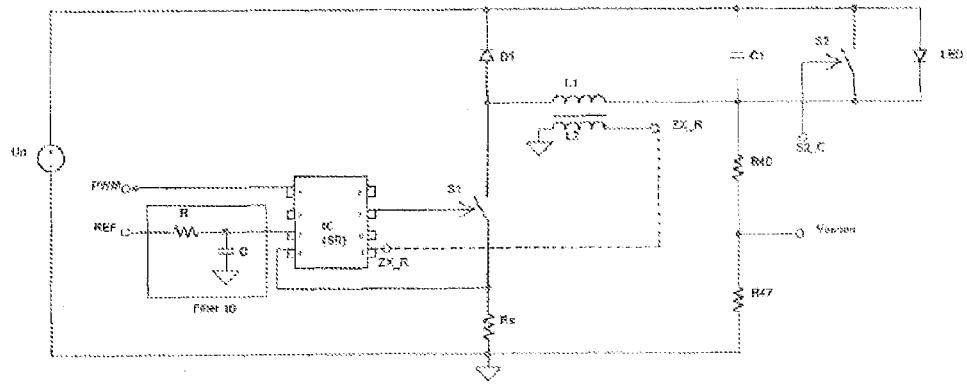
FIG. 6 shows a further specific embodiment of an operating circuit.

A possible development of an operating circuit for LEDs is illustrated in FIG. 6. The identification of the achievement of the demagnetization of the coil L1 on the basis of the monitoring of the voltage at the winding L2 can be performed by a control circuit IC available as standard. This control circuit IC (integrated circuit), corresponds to or contains the control unit SR shown in FIGS. 2 to 5, has an input for identifying the achievement of the demagnetization of a coil on the basis of monitoring of the voltage at a secondary winding applied to the coil. Furthermore, the control circuit IC has an output for actuating a switch and further monitoring inputs.

A first of these monitoring inputs can be used for presetting a reference value such as a reference voltage, for example.

A second monitoring input can be used for monitoring the achievement of a maximum voltage or else, on the basis of a voltage measurement at a resistor, for monitoring the achievement of a maximum current. A third monitoring input can be used for monitoring a further voltage or else for activating and deactivating the control circuit IC or actuating the control circuit IC actuated switch.

In accordance with FIG. 6, the control circuit IC monitors the current through the first switch S1 during the switch-on phase of the first switch S1 via the shunt RS and the input 4 at the control circuit IC. As soon as the voltage which is tapped off across the shunt RS reaches a specific maximum value, the first switch S1 is opened. The presetting of the level of the voltage which is required for opening the first switch S1 can be matched by the presetting of a reference value (i.e. a reference voltage) at the input 3 of the control circuit IC. For example, a reference voltage can be preset by a microcontroller, which reference voltage presets the level of the maximum voltage permissible across the shunt RS and therefore the maximum permissible current through the first switch S1.

For example, the microcontroller can output a PWM control signal, which is then smoothed by a filter 10 (for example an RC element) and thus is present at the input 3 of the control circuit IC as DC voltage signal with a specific amplitude. By changing the duty factor of the PWM control signal of the microcontroller, the amplitude of the signal at the input 3 of the control circuit IC can be matched.

The control circuit IC can identify the achievement of the demagnetization of the coil L1 via the input 5 on the basis of the monitoring of the voltage at a secondary winding L2 applied to the coil L1. This identification can be used as renewed switch-on signal.

As soon as the demagnetization of the coil L1 has been identified by the control circuit IC, the control circuit IC can switch on the first switch S1 by actuation via the output 7.

The control circuit IC can be activated and/or deactivated as well by application of a voltage at the input 1. This voltage for activation at the input 1 can also alternate between a high level and a low level, wherein the control circuit IC is activated in the case of a high level and at least the actuation of the first switch S1 is interrupted in the case of a low level. This actuation of the input 1 can take place by means of a microcontroller. For example, a low-frequency activation and deactivation of the control circuit IC and therefore actuation of the first switch S1 can be achieved in this way and therefore the low-frequency actuation of the operating circuit for dimming of the LED.

Furthermore, a further reference voltage for the control circuit IC can also be preset at the input 1 via the amplitude of the signal present at this input. This voltage can influence, for example, also the level of the maximum permissible current through the switch, but also the permissible switch-on duration of the first switch S1. The control circuit IC and/or the control circuit IC combined with the microcontroller can together form the control unit SR.

In accordance with the invention, the signal PWM, which is supplied to the input 1 of the control circuit IC, can be linked, in accordance with the invention, to the drive signal which is output at the output 7 via a coupling element, for example by an ohmic resistor. Optionally, the signal PWM can also only be linked with the signal of the output 7, and not supplied to the input 1.

The switch-on duration of the first switch S1 can also be dependent on a further voltage measurement within the operating circuit.

For example, a voltage measurement Vsense can also be supplied to the control circuit IC.

Monitoring or else measurement of the voltage at the node between the coil L1 and the LED can take place, for example, via this voltage measurement via a voltage divider R40/R47. This voltage measurement Vsense can be supplied either to a further input of the control circuit IC, as additional variable additively to an already occupied input of the control circuit IC, or else to an input of the microcontroller.

Therefore, a system can be constructed in which firstly simple actuation for dimming LEDs by low-frequency PWM is made possible and secondly high-frequency operation with as few losses as possible of the operating device combined with a current which is as constant as possible through the LED.

Both the frequency and the duty factor of a PWM signal for dimming the LED can be preset by a microcontroller and, in addition to this, the level of the maximum permissible current through the first switch S1 can also be preset. The microcontroller can control the dimming of the LED by low-frequency PWM via a signal which is supplied to the input 1 of the control circuit IC. Furthermore, the microcontroller can preset the level of the maximum permissible current through the first switch S1 or else the required switch-on duration of the first switch S1 via a signal which is supplied to the input 3 of the control circuit IC.

The operating circuit can furthermore contain a further switch S2, which is arranged in such a way that this second switch S2 can bypass the LED.

The second switch S2 can furthermore be arranged in such a way that it can take over the current through an existing high-resistance voltage measurement path or a similar existing high-resistance circuit arrangement from the LED or can interrupt this current.

By means of the second switch S2 being connected in parallel with the LED, said second switch can bypass the LED and therefore deactivate the LED. This method can be used to set the brightness (dim) the LED. A possible alternative variant would be for the dimming to take place via the second switch S2 while only the current through the LED is set and regulated via the actuation of the first switch S1.

However, the actuation of the two switches S1 and S2 can be used in combination for optimized dimming actuation. Thus, for example, the second switch S2 can be used additionally only for dimming to a low dimming level. The operating circuit, owing to the topology provided and the control circuit, is configured such that the output voltage of the operating circuit (i.e. the voltage across the LED) is limited to a maximum permissible value. If the LED is bypassed by closing of the second switch S2, the operating circuit limits the output voltage in such a way that it is not possible for an excessively high current to flow which could result in possible destruction.

This actuation of the second switch S2 can only be used for dimming to a low dimming level, for example.

If the step-down converter (buck converter) operates fixedly in the current source operating mode (in the so-called hysteresis mode as described in the exemplary embodiments) and runs efficiently, the LEDs can be dimmed in specific brightness ranges or operating modes even individually by the second switch S2, which should have a very low resistance, and the losses are nevertheless low.

In addition, the second switch S2 can be actuated in such a way that it can take over the current through an existing high-resistance voltage measurement path or a similar existing high-resistance circuit arrangement from the LED.

If, for example, as shown in FIG. 6, the first switch S1 is not clocked, there should be no current flowing through the LED. Owing to the existing voltage divider R40/R47, however, a low current can flow through the LED. In this case, in the case of a desired deactivation of the LED (for example when no light is intended to be emitted), the second switch S2 can be closed in order that the current flow through the LED is interrupted or avoided.

The second switch S2 can at least always be actuated following a low-frequency PWM packet in order to bypass or deactivate the LED (during the last discharge edge, i.e. at the end of a PWM pulse packet).

Interruption of the current through the LED can also be performed by arranging the second switch S2 in series with the LED.

The example shown in FIG. 6 (and naturally also the others) can be extended to the extent that a plurality of operating circuits as shown in FIG. 6 are provided. The control circuits IC or the control units SR of the individual operating circuits are actuated by a common microcontroller. The individual operating circuits can actuate, for example, LED strings of different wavelength or color. The actuation by the microcontroller can take place via an interface (wirelessly or in wired fashion). In this case, control signals for setting the brightness or color or else status information can be transmitted via the interface.

What is claimed is:

1. An operating circuit for at least one LED, to which a DC voltage or rectified AC voltage is supplied, and which provides a supply voltage for at least one LED by means of a coil (L1) and a first switch (S1) clocked by a control unit (SR), wherein when the first switch (S1) is switched on, energy is buffer-stored in the coil (L1), which is discharged via a diode (D1) and via at least one LED when the first switch (S1) is switched off, the control unit (SR) actuates the first switch (S1) with a dimming signal, wherein the dimming signal is generated by linking of a low-frequency signal and a high-frequency signal, and wherein the operating circuit is arranged such that a pulse width (TON*LF) of the low-frequency signal, which is defined as a width of a pulse packet of the high-frequency, is selected as an integral multiple of the period (T_HF) of the high-frequency signal and wherein the operating circuit is arranged in order to generate the high-frequency signal dependent on a control loop, at least the first switch (S1) is clocked depending on at least one predefined reference value for a current and/or voltage within the operating circuit and a comparison with an actual value, the control unit (SR) is arranged to turn on the first switch when a zero crossing of the current through the coil (L1) occurs.

2. The operating circuit as claimed in claim 1, wherein the control unit (SR) links the low-frequency signal and the high-frequency signal internally to give the dimming signal, and outputs the dimming signal at an output of the control unit (SR).

3. The operating circuit as claimed in claim 2, wherein, during dimming of the LED, the frequency of the low-frequency signal is changed.

4. The operating circuit as claimed in claim 3, wherein the change in the frequency of the low-frequency signal is selected depending on the change in the pulse width (TON*LF) of the low-frequency signal.

5. The operating circuit as claimed in claim 2, wherein a change in the frequency and the pulse width (TON*LF) of the low-frequency signal is performed such that a pulse control factor of the low-frequency signal remains constant at a constant dimming level.

6. The operating circuit as claimed in claim 1, wherein the low-frequency signal is a low-frequency-pulsed signal, in the range of from 100 Hz to 1000 Hz.

7. The operating circuit as claimed in claim 1, wherein the high-frequency signal is a high-frequency-pulsed signal, in the region of 50 kHz.

8. The operating circuit as claimed in claim 1, wherein a change in a brightness of the LED is performed by a change in the frequency of the low-frequency signal.

9. The operating circuit as claimed in claim 1, wherein the low-frequency signal is dependent on at least one of the dimming level of the LED or the high-frequency signal is dependent on at least one of the current or the voltage through the LED.

10. A method for actuating at least one LED, to which a DC voltage or rectified AC voltage is supplied, and which provides a supply voltage for at least one LED by means of a coil (L1) and a first switch (S1) clocked by a control unit (SR), wherein, when the first switch (S1) is switched on, energy is buffer-stored in the coil (L1), which is discharged via a diode (D1) and via at least one LED when the first switch (S1) is switched off, wherein the control unit (SR) actuates the first switch (S1) with a dimming signal, the dimming signal is generated by external linking of a low-frequency signal and a high-frequency signal, wherein the operating circuit is arranged such that a pulse width (TON*LF) of the low-frequency signal, which is defined as a width of a pulse packet of the high frequency, is selected as an integral multiple of the period (T_HF) of the high-frequency signal and wherein the operating circuit is arranged in order to generate the high-frequency signal dependent on a control loop, at least the first switch (S1) is clocked depending on at least one predefined reference value for a current and/or voltage within the operating circuit and a comparison with an actual value, the control unit (SR) is arranged to turn on the first switch when a zero crossing of the current through the coil (L1) occurs.

* * * * *